United States Patent
Wang et al.

(10) Patent No.: US 10,533,901 B2
(45) Date of Patent: Jan. 14, 2020

(54) IMAGING SYSTEM FOR INSPECTING COMPONENTS OF TURBOMACHINES AND METHOD OF ASSEMBLY THEREOF

(71) Applicant: General Electric Company, Schenectady, NY (US)

(72) Inventors: Guanghua Wang, Clifton Park, NY (US); Nirm Velumylum Nirmalan, Liberty Township, OH (US); Mohamed Sakami, West Chester, OH (US); Thomas Charles Adcock, Glenville, NY (US); Jeffrey Jay Porubcan, Averill Park, NY (US); James William Sears, Niskayuna, NY (US); Naveenan Thiagarajan, Clifton Park, NY (US); Bernard Bewlay, Niskayuna, NY (US); Jason Edward Dees, Niskayuna, NY (US); James DeLancey, Corinth, NY (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 15/615,576

(22) Filed: Jun. 6, 2017

(65) Prior Publication Data
US 2018/0348070 A1 Dec. 6, 2018

(51) Int. Cl.
*G01K 13/02* (2006.01)
*G01F 15/04* (2006.01)
(Continued)

(52) U.S. Cl.
CPC ........... *G01K 13/02* (2013.01); *G01F 15/043* (2013.01); *G01K 1/12* (2013.01); *G01K 1/14* (2013.01);
(Continued)

(58) Field of Classification Search
CPC ............ G01K 13/02; G01K 1/14; G01K 1/12; G01K 2013/024; G01K 2205/00;
(Continued)

(56) References Cited

U.S. PATENT DOCUMENTS

| | | | |
|---|---|---|---|
| 5,274,325 A | 12/1993 | Shinagawa et al. | |
| 7,121,098 B2 * | 10/2006 | Hatcher | F23N 5/08 62/5 |

(Continued)

FOREIGN PATENT DOCUMENTS

| | | |
|---|---|---|
| DE | 10 2008 009 912 A1 | 8/2009 |
| JP | 2000-46482 A | 2/2000 |
| JP | 5143634 B2 | 2/2013 |

OTHER PUBLICATIONS

Zhang et al, "Production of complex chalcogenide glass optics by molding for thermal imaging," Journal of Non-Crystalline Solids, vols. 326-327, pp. 519-523 (2003).

(Continued)

*Primary Examiner* — Freddie Kirkland, III
(74) *Attorney, Agent, or Firm* — Armstrong Teasdale LLP

(57) ABSTRACT

An imaging system includes a sight tube extending along a longitudinal axis of the imaging system and configured to extend through an access port. The sight tube includes a wall extending about the longitudinal axis and defining a cavity. The imaging system also includes a plurality of cooling channels extending through the sight tube. The plurality of cooling channels are configured to direct cooling fluid through the sight tube for cooling the imaging system. The plurality of cooling channels are formed in the sight tube such that at least one cooling channel of the plurality of cooling channels extends in a direction oblique to the longitudinal axis.

20 Claims, 11 Drawing Sheets

(51) Int. Cl.
*G01K 1/12* (2006.01)
*G01K 1/14* (2006.01)

(52) U.S. Cl.
CPC ............... *F02D 2200/021* (2013.01); *F02D 2200/0414* (2013.01); *G01K 2013/024* (2013.01); *G01K 2205/00* (2013.01)

(58) Field of Classification Search
CPC ... G02B 23/2492; F01D 25/00; G01F 15/043; F02D 2200/021; F02D 2200/0414
See application file for complete search history.

(56) References Cited

U.S. PATENT DOCUMENTS

| | | | | |
|---|---|---|---|---|
| 7,662,091 | B2* | 2/2010 | Bagley | G02B 23/2492 600/114 |
| 8,184,151 | B2* | 5/2012 | Zombo | F01D 21/003 348/82 |
| 8,688,191 | B2* | 4/2014 | Schuster | G01R 33/3806 600/407 |
| 8,786,848 | B2* | 7/2014 | Hatcher | F01D 9/023 356/237.1 |
| 9,046,694 | B2* | 6/2015 | Hirata | G02B 23/2492 |
| 9,182,285 | B2* | 11/2015 | Lemieux | G02B 23/2476 |
| 9,194,750 | B2 | 11/2015 | Oster et al. | |
| 9,225,914 | B2 | 12/2015 | Kingdon et al. | |
| 9,599,514 | B2* | 3/2017 | Estevadeordal | G01J 5/0859 |
| 9,856,748 | B2* | 1/2018 | Johnston | G01S 13/08 |
| 2004/0216468 | A1* | 11/2004 | Hatcher | F23N 5/08 62/5 |
| 2005/0281520 | A1* | 12/2005 | Kehoskie | G01N 21/954 385/117 |
| 2006/0038988 | A1 | 2/2006 | Thermos | |
| 2007/0107504 | A1* | 5/2007 | Smed | F01D 21/003 73/112.01 |
| 2008/0242927 | A1* | 10/2008 | Hirata | G02B 23/2492 600/109 |
| 2009/0259103 | A1* | 10/2009 | Hirata | A61B 1/00154 600/114 |
| 2011/0069165 | A1* | 3/2011 | Zombo | F01D 21/003 348/82 |
| 2012/0171015 | A1* | 7/2012 | DeLancey | F01D 17/02 415/118 |
| 2012/0281084 | A1* | 11/2012 | Hatcher | F01D 9/023 348/83 |
| 2013/0194411 | A1 | 8/2013 | Baleine et al. | |
| 2013/0314545 | A1 | 11/2013 | Cox et al. | |
| 2015/0300920 | A1* | 10/2015 | DeAscanis | G01M 15/14 356/614 |
| 2016/0380014 | A1 | 12/2016 | Ganapathi et al. | |
| 2017/0234734 | A1* | 8/2017 | Sakami | G02B 23/243 359/820 |

OTHER PUBLICATIONS

Waxman et al, "Color night vision: fusion of intensified visible and thermal IR imagery," Synthetic Vision for Vehicle Guidance and Control, vol. 2463 (1995).
Office Action issued in connection with corresponding CA Application No. 3006129 dated Dec. 19, 2018.
Extended European Search Report and Opinion issued in connection with corresponding EP Application No. 18175323.7 dated Jan. 21, 2019.

* cited by examiner

IMAGING SYSTEM FOR INSPECTING COMPONENTS OF TURBOMACHINES AND METHOD OF ASSEMBLY THEREOF

BACKGROUND

The field of the invention relates generally to imaging systems and, more particularly, to imaging systems for inspecting components along a hot gas path of a turbomachine.

At least some known imaging systems are used for inspecting components along a hot gas path of a turbomachine. For example, at least some known imaging systems include a sight tube or borescope that is configured to extend through an access port of the turbomachine and into the hot gas path of the turbomachine. Accordingly, the imaging system and components of the imaging system, such as the sight tube and optical elements, are exposed to high temperatures and pressures. At least some known imaging systems include supports for the optical elements and cooling systems to reduce the temperature of the optical elements. For example, in at least some imaging systems, cooling channels are formed by machining processes such as drilling or boring. However, in at least some known imaging systems, the configurations of the cooling channels and supports are limited by the manufacturing processes. Also, in at least some known imaging systems, the imaging systems are sized to accommodate the cooling channels and/or optical elements. Moreover, at least some known imaging systems are configured for specific turbomachines and are not useable for different turbomachines.

BRIEF DESCRIPTION

In one aspect, an imaging system is provided. The imaging system includes a sight tube extending along a longitudinal axis of the imaging system and configured to extend through an access port. The sight tube includes a wall extending about the longitudinal axis and defining a cavity. The imaging system also includes a plurality of cooling channels extending through the sight tube. The plurality of cooling channels are configured to direct cooling fluid through the sight tube for cooling the imaging system. The plurality of cooling channels are formed in the sight tube such that at least one cooling channel of the plurality of cooling channels extends in a direction oblique to the longitudinal axis.

In another aspect, an imaging system is provided. The imaging system includes a sight tube extending along a longitudinal axis of the imaging system and configured to extend through an access port of the turbomachine. The sight tube includes a wall extending about the longitudinal axis and defining a cavity therein. The imaging system also includes an optical tube positioned in the cavity such that the optical tube extends along the longitudinal axis. The optical tube is modular and is releasably coupled to the sight tube. The optical tube includes a plurality of optical elements positioned along the longitudinal axis.

DRAWINGS

These and other features, aspects, and advantages of the present invention will become better understood when the following detailed description is read with reference to the accompanying drawings in which like characters represent like parts throughout the drawings, wherein.

Figure 1:
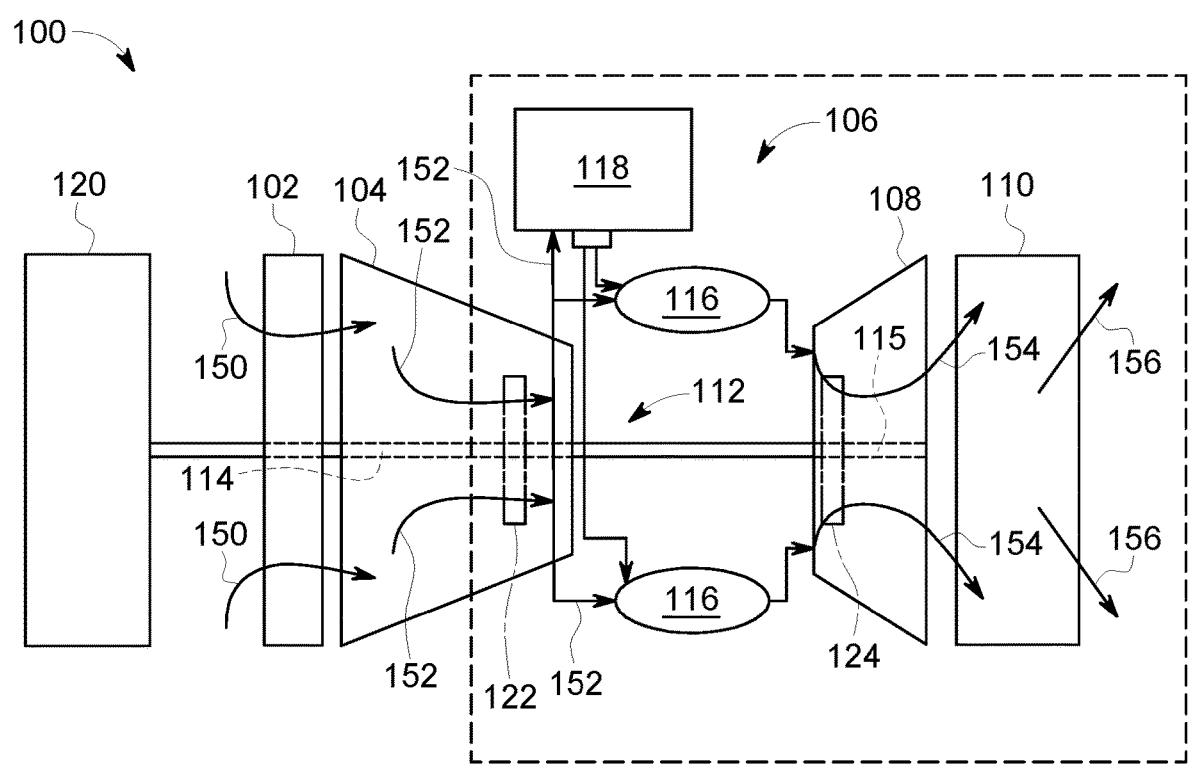
FIG. 1 is a schematic view of an exemplary gas turbine engine.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), a programmable logic unit (PLU), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The methods and systems described herein facilitate inspection of components in turbomachines. For example, an imaging system includes a sight tube defining a cavity and an optical tube received in the cavity. The sight tube is configured to extend into the turbomachine and optical elements are positioned in the optical tube to facilitate the imaging system generating images of the turbomachine. The sight tube and the optical tube are modular to allow replacement of the sight tube and/or the optical tube. The sight tube is manufactured using an additive manufacturing process, which decreases cost to assemble the imaging system and enables the integration of complex features into the sight tube. For example, in some embodiments, a cooling channel having at least one of an angled portion and a curved portion is formed in the sight tube during the additive manufacturing process. In further embodiments, support structures are formed in the sight tube to support the optical tube.

FIG. 1 is a schematic view of a machine, e.g., a turbomachine, and more specifically, a gas turbine engine 100. In the exemplary embodiment, gas turbine engine 100 includes an air intake section 102, a compressor section 104, a combustor section 106, and a turbine section 108. Compressor section 104 is coupled downstream from, and in flow communication with, air intake section 102. In addition, combustor section 106 is coupled downstream from, and in flow communication with, compressor section 104, and turbine section 108 is coupled downstream from, and in flow communication with, combustor section 106. Gas turbine engine 100 includes an exhaust section 110 that is downstream from turbine section 108. Moreover, in the exemplary embodiment, turbine section 108 is coupled to compressor section 104 via a rotor assembly 112 that includes, without limitation, a compressor drive shaft 114 and a turbine drive shaft 115.

In the exemplary embodiment, combustor section 106 includes a plurality of combustor assemblies, i.e., combustors 116, that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via compressor drive shaft 114. For example, in some embodiments, load 120 includes, without limitation, an electrical generator and/or a pump. In the exemplary embodiment, compressor section 104 includes at least one compressor blade assembly 122. Also, in the exemplary embodiment, turbine section 108 includes at least one turbine blade, i.e., turbine bucket 124. Each compressor blade assembly 122 and each turbine bucket 124 is coupled to rotor assembly 112. Specifically, each compressor blade assembly 122 is coupled to compressor drive shaft 114 and each turbine bucket 124 is coupled to turbine drive shaft 115. In alternative embodiments, gas turbine engine 100 has any configuration that enables gas turbine engine 100 to operate as described herein.

In operation, air intake section 102 channels inlet air 150 towards compressor section 104. Compressor section 104 compresses inlet air 150 to higher pressures and temperatures prior to discharging compressed air 152 towards combustor section 106. Compressed air 152 is mixed with fuel (not shown) and ignited within combustor section 106 to generate combustion gases 154 that are channeled downstream towards turbine section 108. Specifically, at least a portion of compressed air 152 is channeled to fuel nozzle assembly 118. Fuel is also channeled to fuel nozzle assembly 118, wherein the fuel is mixed with compressed air 152 and the mixture is ignited within combustors 116. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and/or load 120 via compressor drive shaft 114 and turbine drive shaft 115, and exhaust gases 156 are discharged through exhaust section 110 to ambient atmosphere.

Figure 2:
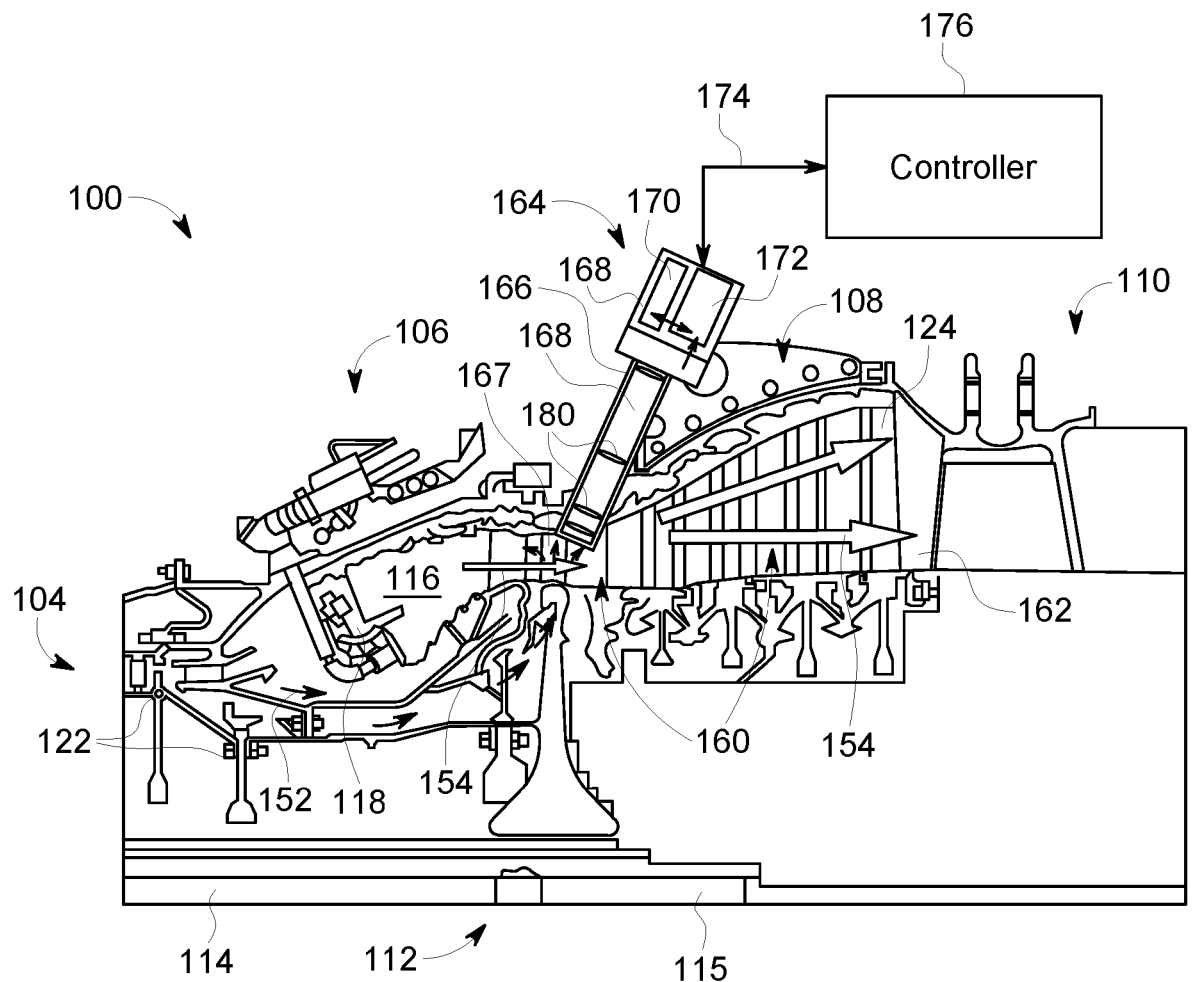
FIG. 2 is an enlarged cross-sectional view of a portion of the gas turbine engine shown in FIG. 1.

FIG. 2 is an enlarged cross-sectional view of a portion of gas turbine engine 100. Turbine section 108 includes a hot gas path 160 at least partially defined by turbine buckets 124. Turbine section 108 also includes a plurality of stationary blades, i.e., vanes 162 that further define hot gas path 160. An imaging system 164 is used to inspect gas turbine engine 100. Imaging system 164 includes at least one sight tube 166 extending into a portion of hot gas path 160. For example, in some embodiments, sight tube 166 extends through an access port into a portion of hot gas path 160. Sight tube 166 is rigid and is sized to fit through the access port and extend into hot gas path 160. In some embodiments, sight tube 166 is flexible to facilitate sight tube 166 extending through the access port and into hot gas path 160. In the exemplary embodiment, sight tube 166 is directed toward a portion of hot gas path 160 defined by a first stage turbine bucket, i.e., a stage one bucket (S1B) 167 in the vicinity of the coupling of combustors 116 to turbine section 108. Imaging system 164 is configured to generate an image of S1B 167. In alternative embodiments, sight tube 166 is directed toward any portion of gas turbine engine 100 that enables imaging system 164 to operate as described herein.

In the exemplary embodiment, imaging system 164 also includes at least one processor 170 and a memory device 172 coupled to processor 170. Gas turbine engine 100 includes a controller 176 coupled to processor 170. In operation, temperature measurements of S1B 167 generated by imaging system 164 are transmitted to controller 176. Controller 176 is configured to determine operating characteristics of gas turbine engine 100 and control operation of gas turbine engine 100 based on information from imaging system 164. In alternative embodiments, gas turbine engine 100 includes any controller 176 that enables gas turbine engine 100 to operate as described herein.

In alternative embodiments, imaging system 164 is used to inspect any components in a high pressure and/or high temperature environment. For example, in some embodiments, imaging system 164 is used to inspect an aircraft engine. In the exemplary embodiment, imaging system 164 is used to generate any image such as thermal images of components in the high pressure and/or high temperature environment.

Figure 3A:
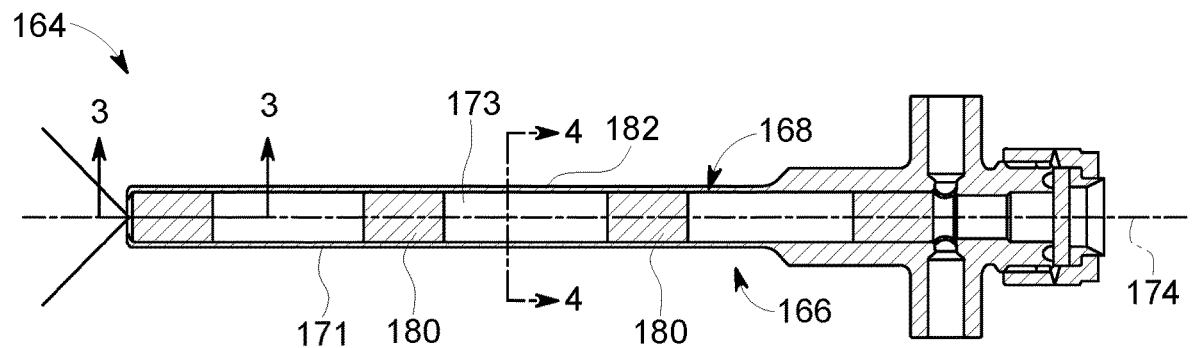
FIG. 3A is an enlarged cross-sectional view of an imaging system of the gas turbine engine shown in FIGS. 1 and 2.

FIG. 3A is a cross-sectional view of imaging system 164. Imaging system 164 includes sight tube 166 and an optical tube 168 extending along a longitudinal axis 174. Sight tube 166 includes a wall 171 extending about longitudinal axis 174 and defining a cavity 173. Optical tube 168 is positioned in cavity 173 and includes a wall 178 configured to fit within cavity 173 of sight tube 166. In the exemplary embodiment, wall 171 and wall 178 are cylindrical. In alternative embodiments, imaging system 164 includes any sight tube 166 and/or optical tube 168 that enables imaging system 164 to operate as described herein. For example, in some embodiments, sight tube 166 and/or optical tube 168 is a prism such as a triangular prism and a cuboid.

In addition, in the exemplary embodiment, optical tube 168 includes a plurality of optical elements 180 positioned along longitudinal axis 174. Optical elements 180 are configured to direct and/or process light to facilitate imaging system 164 generating images of gas turbine engine 100. For example, in some embodiments, optical elements 180 include lenses that diffract light through optical tube 168. In further embodiments, optical elements 180 include optical fibers. In alternative embodiments, imaging system 164 includes any component that enables imaging system 164 to operate as described herein. For example, in some embodiments, imaging system 164 includes, without limitation, single wavelength pyrometers, multi-wavelength pyrometers, measurement sensors, two-dimensional (2-D) imaging sensors, stereoscopic or three-dimensional (3-D) imaging sensors, lens based collection optics, mirror based collection optics, fiber-bundle based collection optics, spectrometers, dichroic mirrors, optical filters, stationary imaging mechanisms, imaging mechanisms such as scanning systems, translation robotics, and rotation robotics, spectral window sensors, infrared sensors, visible light sensors, and/or transient infrared sensors. In further embodiments, imaging system 164 is configured for phosphorescence temperature measurement.

In the exemplary embodiment, a plurality of cooling channels 182 extend through sight tube 166. Cooling channels 182 are configured to direct cooling fluid through imaging system 164 to reduce the temperature of imaging system 164. Accordingly, cooling channels 182 facilitate imaging system 164 operating in environments having relatively high temperatures and pressures. For example, imaging system 164 is configured to withstand temperatures and pressures of hot gas path 160 (shown in FIG. 2). In the exemplary embodiment, cooling channels 182 are formed in sight tube 166 during an additive manufacturing process. Accordingly, cooling channels 182 are able to have complex shapes. For example, in some embodiments, cooling channels 182 include at least one of a curve and an angle along the extension of cooling channels 182 through sight tube 166.

Also, in the exemplary embodiment, optical tube 168 is releasably coupled to sight tube 166 and positioned in cavity 173 such that optical elements 180 are positioned along longitudinal axis 174. Optical tube 168 and sight tube 166 are modular. In other words, optical tube 168 is compatible with different sight tubes 166 and sight tube 166 is compatible with different optical tubes 168. Accordingly, in some embodiments, optical tube 168 and/or sight tube 166 is removed and replaced to allow imaging system 164 to operate with different gas turbine engines 100. In alternative embodiments, optical tube 168 and sight tube 166 are coupled in any manner that enables imaging system 164 to operate as described herein.

In the exemplary embodiment, imaging system 164 is configured to withstand the relatively high temperatures and pressures along hot gas path 160 (shown in FIG. 2). Moreover, features of imaging system 164, such as cooling channels 182, reduce the temperatures of imaging system 164 during operation within the relatively high temperature and pressure environments. For example, sight tube 166, optical tube 168, and cooling channels 182 have shapes that are formed in an additive manufacturing process and facilitate the efficient transfer of heat to a cooling fluid flow through imaging system 164. Accordingly, imaging system 164 is configured to maintain the entirety of imaging system 164, including, for example, electronics, optics, and housings, at temperatures within operating limits.

Figure 3B:
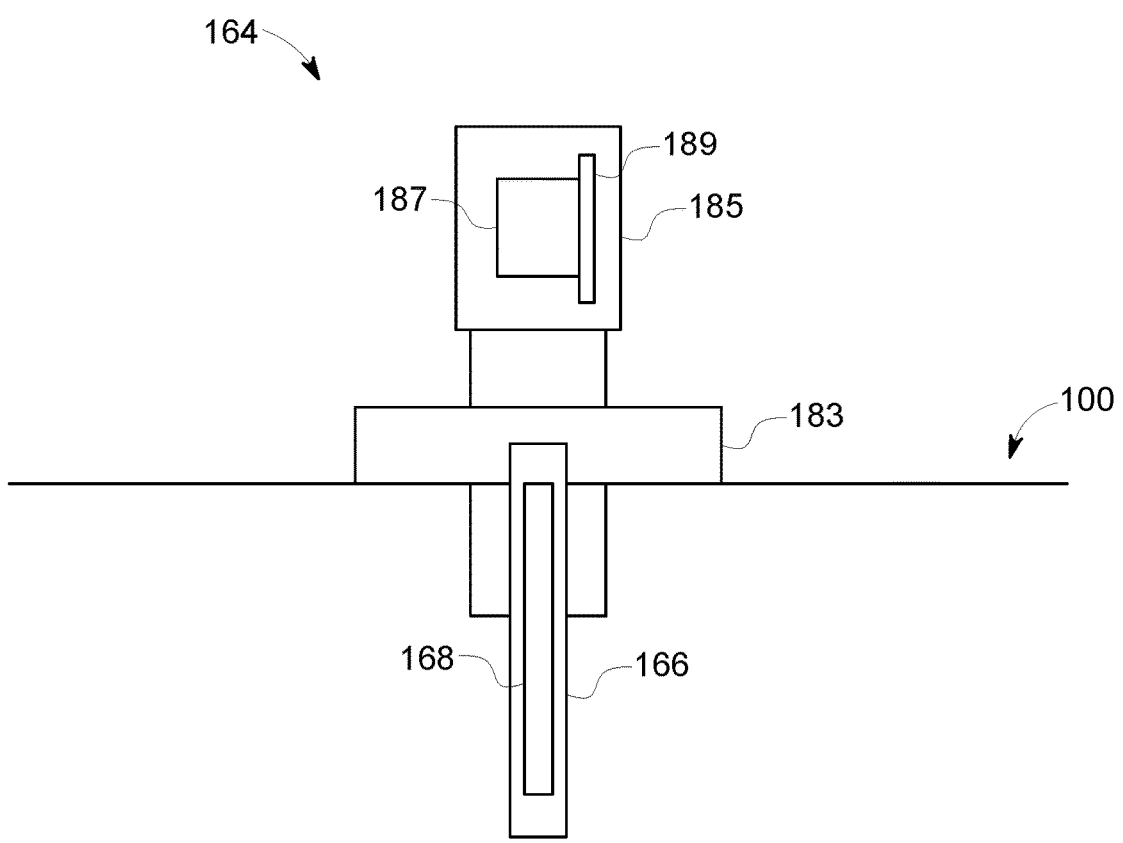
FIG. 3B is a schematic view of the imaging system shown in FIG. 3A positioned in the gas turbine engine shown in FIGS. 1 and 2.

FIG. 3B is a schematic view of imaging system 164 positioned in gas turbine engine 100. Imaging system 164 includes a flange 183. Flange 183 is configured to mount on a portion of gas turbine engine 100 such as a casing and/or borescope ports, and receive sight tube 166 such that sight tube 166 extends through flange 183 and into gas turbine engine 100. In some embodiments, flange 183 includes a biasing member such as a spring to holds sight tube 166 in position and allow for thermal expansion and alignment of sight tube 166 when sight tube 166 is coupled to flange 183. In alternative embodiments, imaging system 164 includes any flange 183 that enables imaging system 164 to operate as described herein.

During operation, flange 183 is coupled to a casing or borescope port of gas turbine engine 100. Optical tube 168 is assembled and positioned within cavity 173 of sight tube 166. Sight tube 166 is positioned in gas turbine engine 100 and coupled to flange 183. A camera casing 185 is coupled to flange 183 in focal communication with optical tube 168. A camera 187 and a focusing slide 189 are positioned in camera casing 185 and configured to facilitate imaging system 164 generating images. In alternative embodiments, imaging system 164 has any configuration that enables imaging system 164 to operate as described herein.

Figure 4:
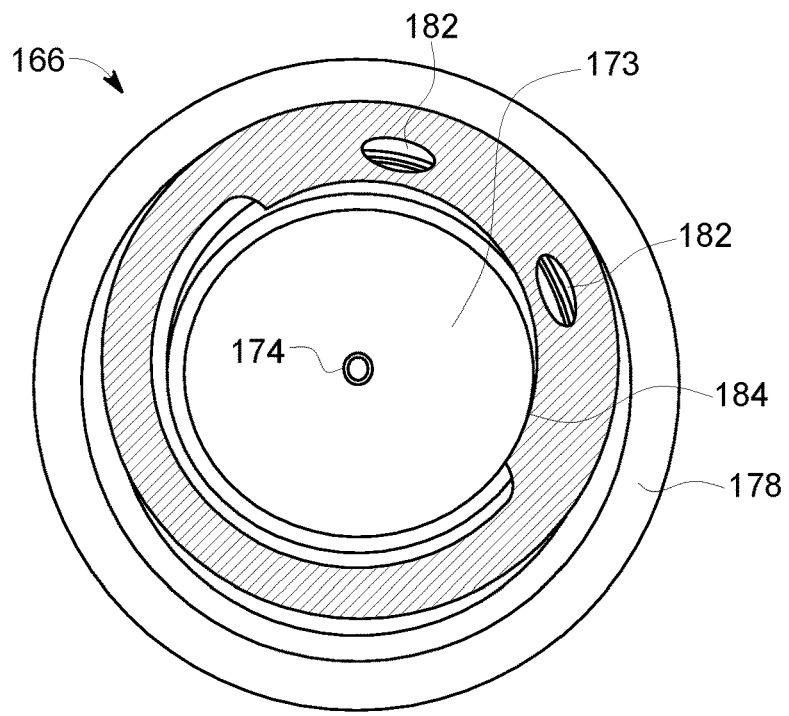
FIG. 4 is an enlarged cross-sectional view of a sight tube of the imaging system shown in FIG. 3A and taken along line 4-4.
Figure 5:
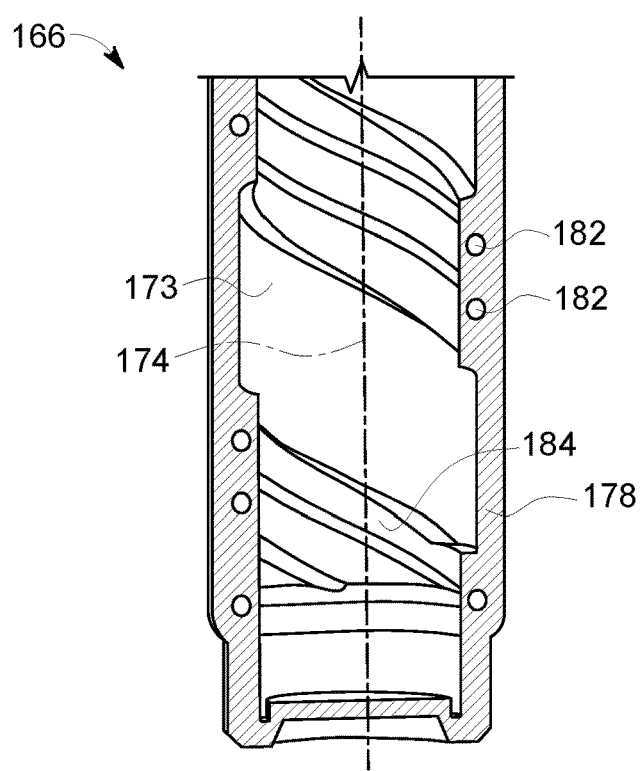
FIG. 5 is an enlarged cross-sectional view of a portion of the sight tube of the imaging system shown in FIG. 3A and taken along line 5-5.

FIG. 4 is an enlarged cross-sectional view of sight tube 166 of imaging system 164 (shown in FIG. 3A) and taken along line 4-4. FIG. 5 is an enlarged cross-sectional view of a portion of sight tube 166 of imaging system 164 (shown in FIG. 3A) and taken along line 5-5. Sight tube 166 includes a plurality of cooling channels 182. Cooling channels 182 extend in a first direction parallel to longitudinal axis 174 and in a second direction oblique to longitudinal axis 174. As used herein, the term "oblique" refers to a direction that is not parallel or perpendicular to a reference. In addition, cooling channels 182 extend about longitudinal axis 174 and have a helical shape. The directions and shape of cooling channels 182 allow sight tube 166 to have a reduced size and enable cooling channels 182 to extend alongside optical elements 180 (shown in FIG. 3A). Moreover, cooling channels 182 facilitate the removal of heat from optical tube 168 (shown in FIG. 3A) and enable imaging system 164 (shown in FIG. 3A) to operate in environments having relatively high temperatures and pressures such as along hot gas path 160. In addition, cooling channels 182 are connected in flow communication with each other and form a closed-loop cooling system, i.e., cooling channels 182 are sealed from an exterior of sight tube 166. As a result, cooling flow through cooling channels 182 is inhibited from interfering with measurements of imaging system 164 (shown in FIG. 3A) and the required amount of cooling flow is reduced. In alternative embodiments, sight tube 166 includes any cooling channel 182 that enables imaging system 164 to operate as described herein.

In the exemplary embodiment, sight tube 166 further includes at least one support structure 184 configured to support and position optical tube 168 (shown in FIG. 3A) within sight tube 166. As shown in FIG. 5, support structure 184 has a helical shape and is aligned with cooling channels 182. Accordingly, cooling channels 182 are configured to remove heat from optical tube 168 (shown in FIG. 3A) and optical elements 180 (shown in FIG. 3A) when optical tube 168 contacts support structure 184. In addition, in some embodiments, support structures 184 are configured to facilitate heat removal from optical tube 168. As a result, cooling channels 182 and support structures 184 facilitate optical tube 168 having a reduced temperature when imaging system 164 is in environments having relatively high temperatures and pressures. In alternative embodiments, sight tube 166 includes any support structure 184 that enables sight tube 166 to operate as described herein. For example, in some embodiments, support structure 184 includes a flexible material, such as a foam and/or a spring, configured to reduce vibration of optical elements 180.

In reference to FIG. 3A, in the exemplary embodiment, cooling channels 182 are configured to contain a heat transfer fluid such as water and/or air. The heat transfer fluid is configured to receive heat from optical tube 168 and optical elements 180 and transfer heat to a heat sink (not shown). In alternative embodiments, cooling channels 204 are configured to contain any material that enables imaging system 164 to operate as described herein. For example, in some embodiments, an insulating material such as a ceramic material is positioned in cooling channels 204. In further embodiments, cooling channels 204 are configured to contain a vacuum.

Figure 6:
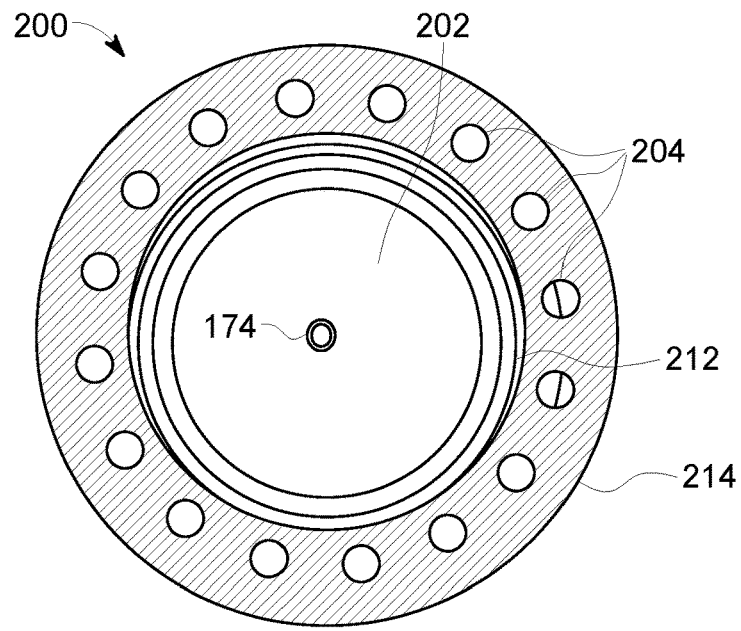
FIG. 6 is an enlarged cross-sectional view of an alternative embodiment of a sight tube for use with the imaging system shown in FIG. 3A.
Figure 7:
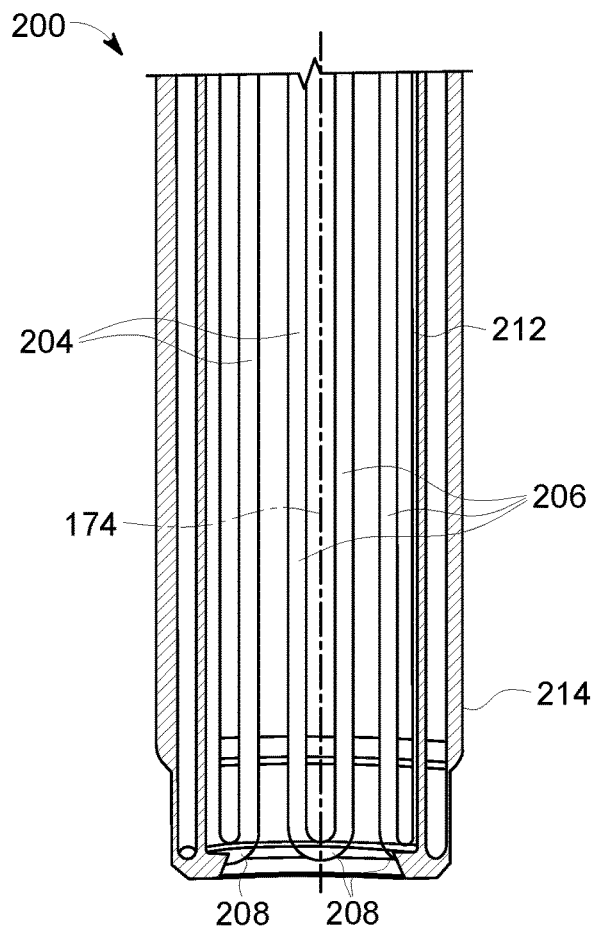
FIG. 7 is an enlarged cross-sectional view of a portion of the sight tube shown in FIG. 6.

FIG. 6 is an enlarged cross-sectional view of a sight tube 200 for use with imaging system 164 (shown in FIG. 3A). FIG. 7 is an enlarged cross-sectional view of a portion of sight tube 200. Sight tube 200 is configured to receive optical tube 168 (shown in FIG. 3A) within a cavity 202. Sight tube 200 includes a plurality of cooling channels 204. Cooling channels 204 are sealed from an exterior of sight tube 200 and form a closed-loop cooling system. Cooling channels 204 include linear portions 206 and curved portions 208. Linear portions 206 extend parallel to longitudinal axis 174. Curved portions 208 extend between and connect linear portions 206. Accordingly, cooling channels 204 facilitate sight tube 200 having a reduced size.

In the exemplary embodiment, sight tube 200 includes a wall 238 extending about longitudinal axis 174 and defining cavity 202. Wall 238 includes an inner radial surface 212 and an outer radial surface 214. Outer radial surface 214 is spaced radially outward from inner radial surface 212. Cooling channels 204 are located between inner radial surface 212 and outer radial surface 214. In alternative embodiments, cooling channels 204 are located anywhere that enables sight tube 200 to function as described herein. For example, in some embodiments, cooling channels 204 extend at least partially radially inward of inner radial surface 212.

Figure 8:
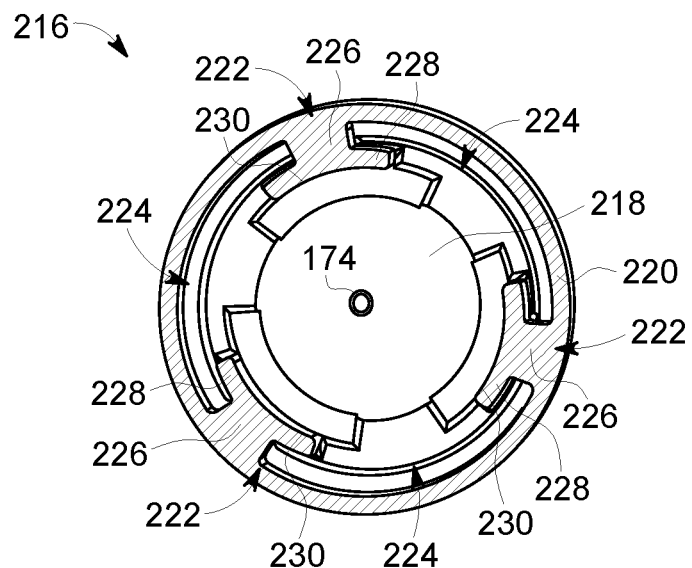
FIG. 8 is an enlarged cross-sectional view of an alternative embodiment of a sight tube for use with the imaging system shown in FIG. 3A and including support structures.

FIG. 8 is an enlarged cross-sectional view of a sight tube 216 for use with imaging system 164 (shown in FIG. 3A) and including support structures 222. Sight tube 216 is configured to receive optical tube 168 (shown in FIG. 3A) within a cavity 218. Sight tube 216 includes a wall 220, a plurality of support structures 222, and a plurality of cooling channels 224. Wall 220 extends about longitudinal axis 174 and defines cavity 218. Support structures 222 extend from wall 220 into cavity 218 to facilitate positioning optical tube 168 (shown in FIG. 3A) within cavity 218. In alternative embodiments, sight tube 216 includes any component that enables sight tube 216 to function as described herein.

In the exemplary embodiment, cooling channels 224 are defined by wall 220 and support structures 222. In addition, cooling channels 224 are at least partially open to allow fluid flow between cooling channels 224 and cavity 218. Accordingly, cooling channels 224 form an open-loop cooling system. Cooling channels 224 are configured to direct cooling fluid through sight tube 216 and along optical tube 168 (shown in FIG. 3A) during operation of imaging system 164 (shown in FIG. 3A).

In addition, in the exemplary embodiment, support structures 222 extend along wall 220 parallel to longitudinal axis 174. Support structures 222 include a base 226 and a flange 228. Flange 228 defines a contact surface 230 configured to contact optical tube 168 (shown in FIG. 3A) when optical tube 168 is coupled to sight tube 216. Flange 228 is spaced from wall 220. In addition, flange 228 has a width that is greater than a width of base 226. Cooling channels 204 are defined between flanges 228 and wall 220. Moreover, flanges 228 of adjacent support structures 222 are spaced from each other such that at least a portion of optical tube 168 (shown in FIG. 3A) is free from contact with support structures 222 to allow fluid flow to contact optical tube 168 and reduce the conduction of heat from support structures 222 to optical tube 168.

Also, in the exemplary embodiment, sight tube 216 includes three support structures 222 spaced equal angular distances about longitudinal axis 174. In alternative embodiments, sight tube 216 includes any support structure 222 that enables sight tube 216 to function as described herein.

In reference to FIGS. 3 and 8, in some embodiments, contact surface 230 is configured to reduce heat transfer to optical tube 168 and optical elements 180 positioned within optical tube 168. For example, in some embodiments, contact surface 230 is a porous surface configured to reduce the contact between support structures 222 and optical tube 168 and facilitate cooling optical tube 168. In alternative embodiments, support structures 222 include any contact surface 230 that enables sight tube 216 to function as described herein.

Figure 9:
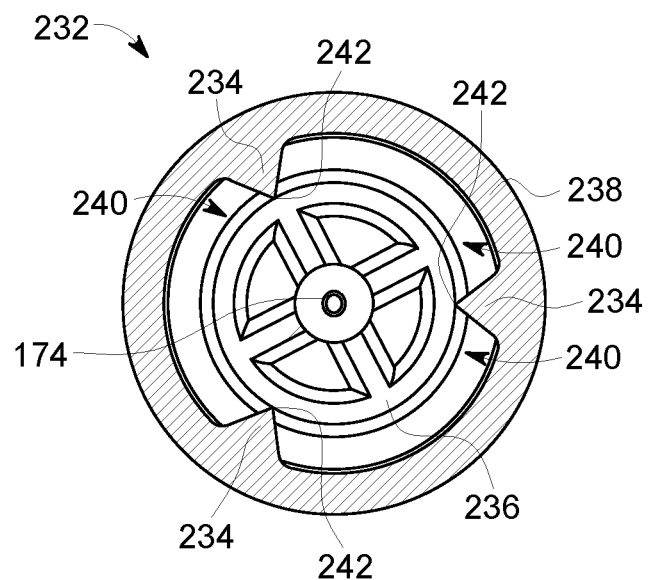
FIG. 9 is an enlarged cross-sectional view of an alternative embodiment of a sight tube for use with the imaging system shown in FIG. 3A and including wedge-shaped support structures.

FIG. 9 is an enlarged cross-sectional view of a sight tube 232 for use with imaging system 164 (shown in FIG. 3A) and including support structures 234. Sight tube 232 is configured to receive optical tube 168 (shown in FIG. 3A) within a cavity 236. Sight tube 232 includes a wall 238, a plurality of support structures 234, and a plurality of cooling channels 240. Wall 238 extends about longitudinal axis 174 and defines cavity 236. Support structures 234 extend from wall 238 into cavity 236 to facilitate positioning optical tube 168 (shown in FIG. 3A) within cavity 236. In some embodiments, support structures 234 includes a lattice. In alternative embodiments, sight tube 232 includes any component that enables sight tube 232 to function as described herein.

In the exemplary embodiment, support structures 234 are wedge-shaped and include a ridge 242 configured to contact optical tube 168 (shown in FIG. 3A). Accordingly, ridges 242 reduce the area of contact between sight tube 232 and optical tube 168 (shown in FIG. 3A) and, thereby, reduce transfer of heat between sight tube 232 and optical tube 168. Moreover, a majority of optical tube 168 is free from contact with support structures 234. As used herein, the term "majority" refers to a quantity greater than 50%. In alternative embodiments, support structures 234 have any shape that enables sight tube 232 to function as described herein.

Figure 10:
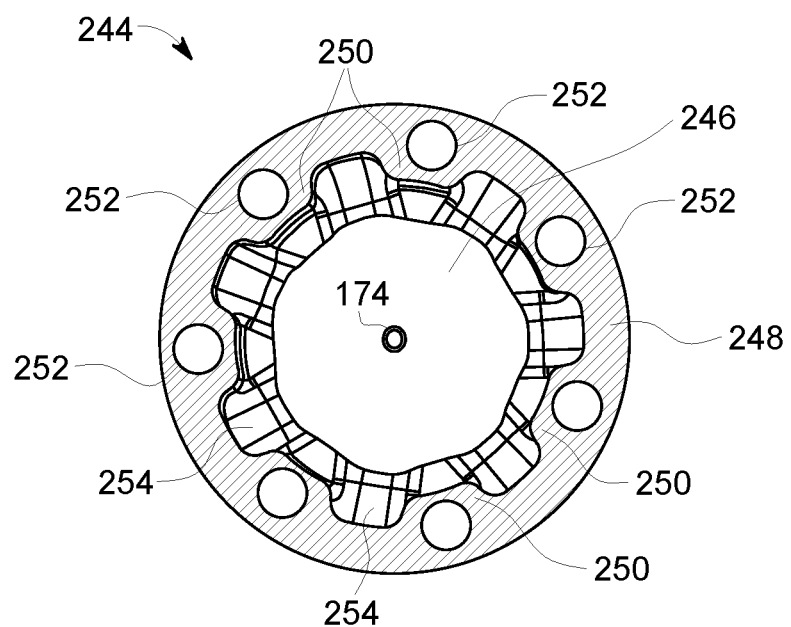
FIG. 10 is an enlarged cross-sectional view of an alternative embodiment of a sight tube for use with the imaging system shown in FIG. 3A and including an open-loop cooling system and a closed-loop cooling system.

FIG. 10 is an enlarged cross-sectional view of a sight tube 244 for use with imaging system 164 (shown in FIG. 3A) and including an open-loop cooling system and a closed-loop cooling system. Sight tube 244 is configured to receive optical tube 168 (shown in FIG. 3A) within a cavity 246. Sight tube 244 includes a wall 248, a plurality of support structures 250, a plurality of first cooling channels 252, and a plurality of second cooling channels 254. Wall 248 extends about longitudinal axis 174 and defines cavity 246. Support structures 250 extend from wall 248 into cavity 246 to facilitate positioning optical tube 168 (shown in FIG. 3A) within cavity 246. In alternative embodiments, sight tube 244 includes any component that enables sight tube 216 to function as described herein.

Also, in the exemplary embodiment, first cooling channels 252 extend through sight tube 244 and are sealed from an exterior of sight tube 244. Accordingly, first cooling channels 252 are closed-loop cooling channels. In addition, in the exemplary embodiment, wall 248 and support structures 250 at least partially define second cooling channels 254. Second cooling channels 254 are at least partially open to allow fluid flow through sight tube 244. Accordingly, second cooling channels 254 are open-loop cooling channels.

In addition, in the exemplary embodiment, sight tube 244 is produced using an additive manufacturing process which enables sight tube 244 to include a closed-loop cooling system formed by first cooling channels 252 and an open-loop cooling system formed by second cooling channels 254. In addition, the additive manufacturing process allows sight tube 244 to have a reduced size. For example, the additive manufacturing process allows first cooling channels 252 and second cooling channels 254 to have relatively complex shapes including curved portions and angled portions. In contrast, at least some known sight tubes only include linear portions that are formed by machining processes, e.g., boring or drilling.

Figure 11:
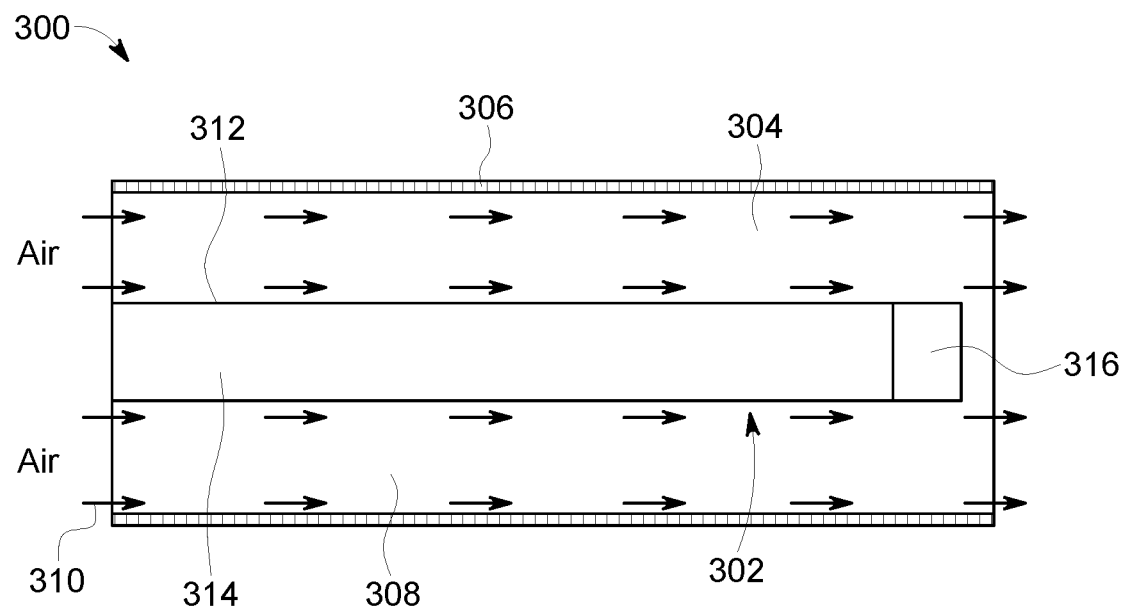
FIG. 11 is a schematic view of fluid flow through an alternative embodiment of a sight tube for use with the imaging system shown in FIG. 3A.

FIG. 11 is a schematic view of fluid flow through a sight tube 300 for use with imaging system 164 (shown in FIG. 3A). Sight tube 300 includes a wall 306 defining cavity 304. Sight tube 300 is configured to receive an optical tube 302 within cavity 304 such that an annular space 308 is defined between optical tube 302 and wall 306. Annular space 308 acts as a cooling channel for a fluid 310 to flow along optical tube 302 and transfer heat from optical tube 302 to an exterior of sight tube 300. Accordingly, sight tube 300 includes an open-loop cooling system. In some embodiments, fluid 310 includes air and/or water. In alternative embodiments, sight tube 300 includes any cooling system that enables sight tube 300 to operate as described herein.

In the exemplary embodiment, optical tube 302 includes a sidewall 312 and an optical element 316. Sidewall 312 defines an optical port 314 and optical element 316 is positioned within optical port 314. In the exemplary embodiment, optical element 316 includes an infrared camera. In alternative embodiments, optical tube 302 includes any optical element 316 that enables optical tube 302 to function as described herein.

Figure 12:
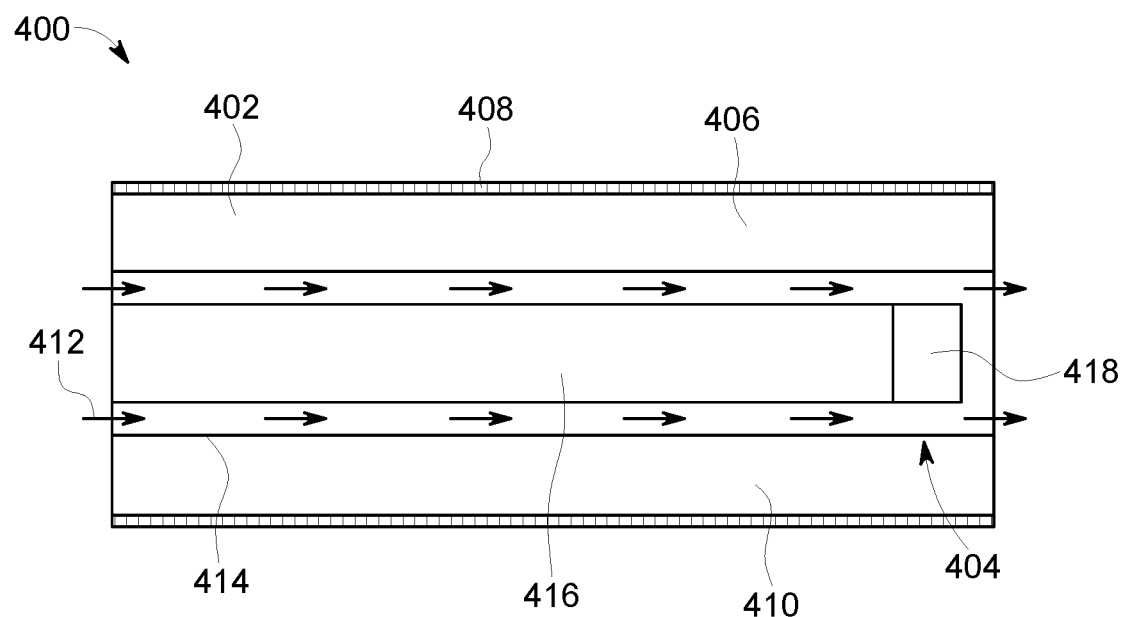
FIG. 12 is a schematic view of fluid flow through an alternative embodiment of a sight tube for use with the imaging system shown in FIG. 3A and including insulation.

FIG. 12 is a schematic view of fluid flow through a sight tube 400 for use with imaging system 164 (shown in FIG. 3A) and including insulation 402. Sight tube 400 includes a wall 408 defining cavity 406. Sight tube 400 is configured to receive an optical tube 404 within cavity 406 such that an annular space 410 is defined between optical tube 404 and wall 408. Insulation 402 is positioned along an interior of wall 408 within annular space 410. Annular space 410 acts as a cooling channel between insulation 402 and optical tube 404 for a fluid 412 to flow along optical tube 404 and transfer heat from optical tube 404 to an exterior of sight tube 400. Accordingly, sight tube 400 includes an open-loop cooling system. In the exemplary embodiment, insulation 402 inhibits heat transferring through wall 408 toward fluid 412 and optical tube 404.

Also, in the exemplary embodiment, optical tube 404 includes a wall 414 and an optical element 418. Optical tube 404 defines an optical port 416 and optical element 418 is positioned within optical port 416. In the exemplary embodiment, optical element 418 includes an infrared camera. In alternative embodiments, optical tube 404 includes any optical element 418 that enables optical tube 404 to function as described herein.

In addition, in the exemplary embodiment, insulation 402 is configured to inhibit wall 408 transferring heat between annular space 410 and the exterior of sight tube 400. Insulation 402 includes any insulation material that enables sight tube 400 to operate as described herein. For example, in some embodiments, insulation 402 includes, without limitation, fiberglass and ceramic. In further embodiments, insulation 402 includes a cover such as a reflective foil to reduce radiation heat transfer.

Figure 13:
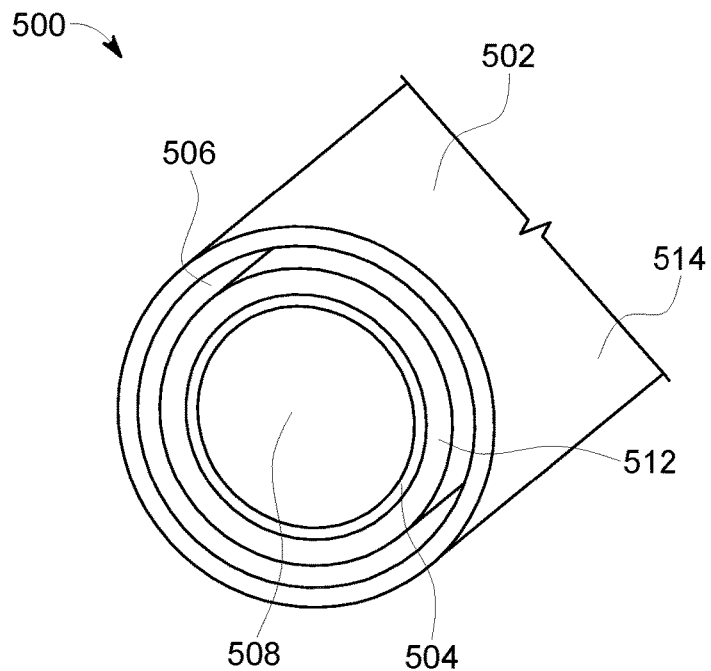
FIG. 13 is a perspective view of a portion of an alternative embodiment of a sight tube for use with the imaging system shown in FIG. 3A.
Figure 14:
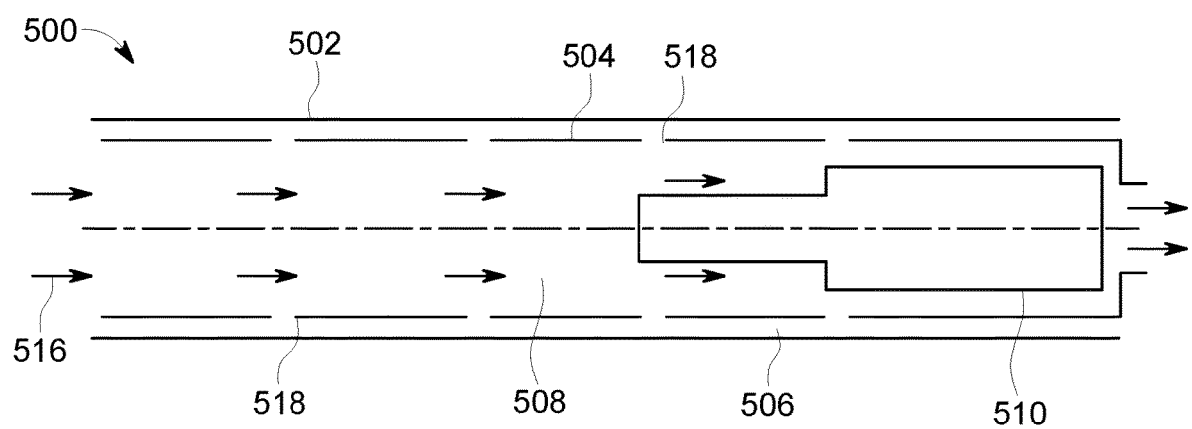
FIG. 14 is a schematic view of fluid flow through the sight tube shown in FIG. 13.

FIG. 13 is a perspective view of a portion of a sight tube 500 for use with the imaging system 164 (shown in FIG. 3A). FIG. 14 is a schematic view of fluid flow through sight tube 500. Sight tube 500 includes an outer wall 502 and an inner wall 504. Outer wall 502 is spaced radially outward from inner wall 504 such that an annular space 506 is defined therebetween. Inner wall defines a cavity 508 configured to receive optical elements 510. In the exemplary embodiment, optical elements 510 include an infrared camera. In alternative embodiments, sight tube 500 is configured to receive any optical elements 510 that enable sight tube 500 to operate as described herein. For example, in some embodiments, optical elements 510 are positioned in an optical tube that is received in sight tube 500.

In the exemplary embodiment, insulation 512 is located within annular space 506. In particular, insulation 512 is positioned about inner wall 504. In addition, fluid such as air is contained between outer wall 502 and inner wall 504. Accordingly, sight tube 500 has a double-wall construction and is configured to reduce heat transfer to optical elements 510. In alternative embodiments, sight tube 500 has any configuration that enables sight tube 500 to operate as described herein. For example, in some embodiments, insulation 512 is omitted. In further embodiments, sight tube 500 includes intermediate walls and/or structures between inner wall 504 and outer wall 502. In the exemplary embodiment, inner wall 504 includes openings 518 configured to reduce pressure in annular space 506.

Also, in the exemplary embodiment, inner wall 504 and outer wall 502 are constructed of metals including, for example and without limitation, stainless steel, nickel-based super alloys, and cobalt-based super alloys. In some embodiments, portions of sight tube 500 such as the outer surfaces of outer wall 502 and inner wall 504, are polished and have a relatively low emissivity. In alternative embodiments, sight tube 500 is assembled in any manner and includes any material that enables sight tube 500 to function as described herein.

In addition, in the exemplary embodiment, insulation 512 includes any insulation material that enables sight tube 500 to operate as described herein. For example, in some embodiments, insulation 512 includes, without limitation, fiberglass and ceramic. In addition, in the exemplary embodiment, insulation 512 includes a reflective foil 514 configured to reduce radiation heat transfer through insulation 512.

Moreover, in the exemplary embodiment, inner wall 504 is configured to direct fluid 516 through sight tube 500 and along optical elements 510 to transfer heat from optical elements 510 to an exterior of sight tube 500. Accordingly, sight tube 500 includes an open-loop cooling system. In some embodiments, fluid 516 includes air and/or water. In alternative embodiments, sight tube 500 uses any fluid 516 that enables sight tube 500 to operate as described herein.

Figure 15:
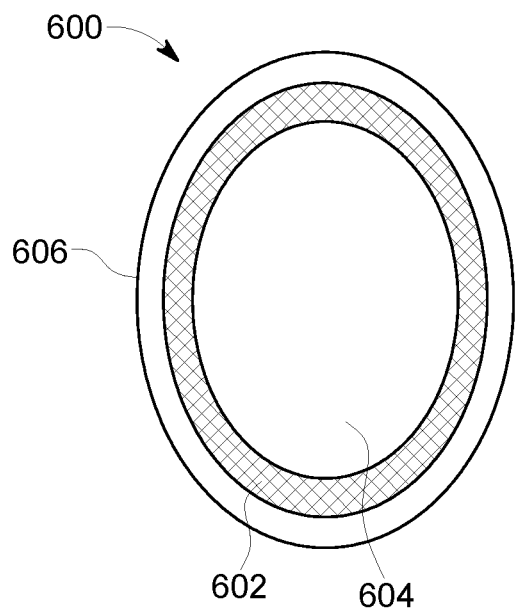
FIG. 15 is an enlarged cross-sectional view of an alternative embodiment of a sight tube for use with the imaging system shown in FIG. 3A and including a lattice.

FIG. 15 is an enlarged cross-sectional view of a sight tube 600 for use with imaging system 164 (shown in FIG. 3A) and including a lattice 602. Sight tube 600 is configured to receive optical tube 168 (shown in FIG. 3A) within a cavity 604. Sight tube 600 includes a wall 606. Wall 606 and lattice 602 extend about longitudinal axis 174. Lattice 602 is coupled to an interior of wall 606 and facilitates positioning optical tube 168 (shown in FIG. 3A) within cavity 604. In alternative embodiments, sight tube 600 includes any component that enables sight tube 600 to function as described herein.

In the exemplary embodiment, lattice 602 is configured to contact optical tube 168 (shown in FIG. 3A) and facilitate cooling fluid removing heat from optical tube 168. In addition, lattice 602 reduces the area of contact between sight tube 600 and optical tube 168 (shown in FIG. 3A) and, thereby, reduces transfer of heat between sight tube 600 and optical tube 168. In alternative embodiments, support structures 234 have any shape that enables sight tube 232 to function as described herein.

Figure 16:
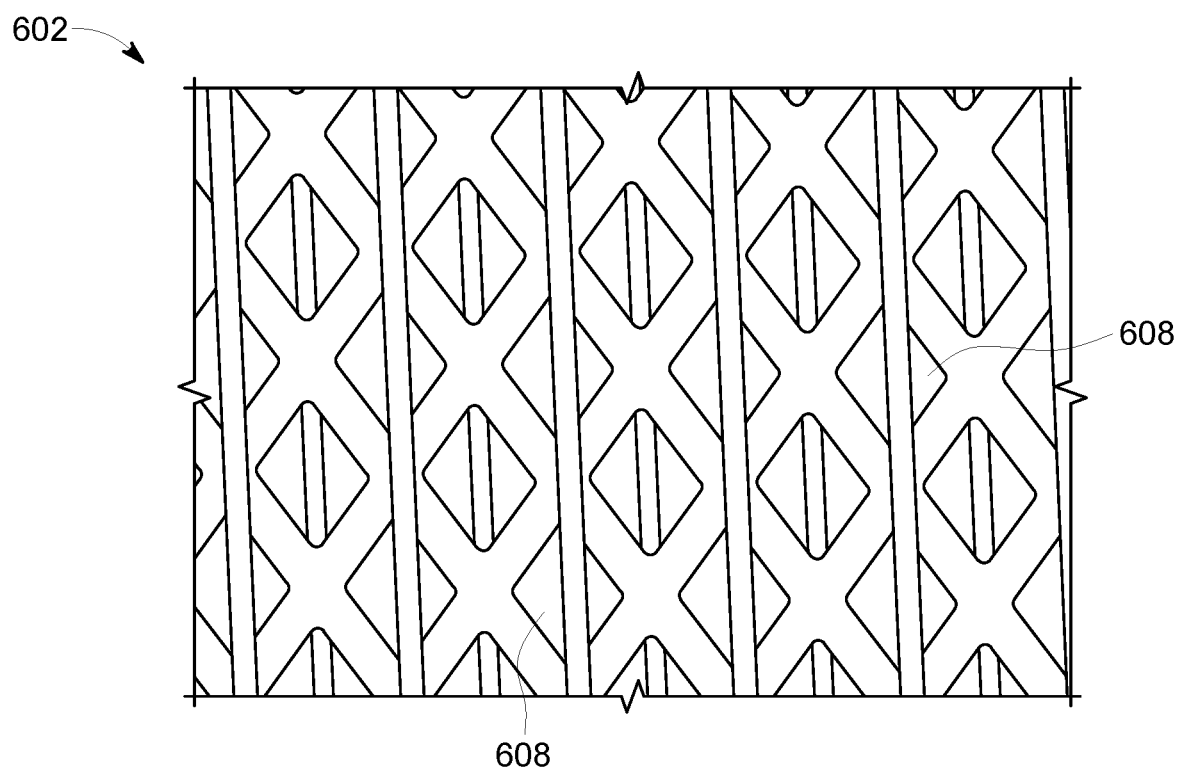
FIG. 16 is an enlarged view of a portion of the lattice shown in FIG. 15.

FIG. 16 is an enlarged view of a portion of lattice, broadly a support structure, 602. In some embodiments, lattice 602 includes elements having a width in a range of about 200 micrometers to about 500 micrometers. In the exemplary embodiment, elements of lattice 602 have a width of approximately 300 micrometers. Lattice 602 defines a plurality of openings 608. In some embodiments, openings 608 have a width in a range of about 50 micrometers to about 10,000 micrometers. In further embodiments, openings 608 have a width in a range of about 100 micrometers to about 1,000 micrometers. In the exemplary embodiment, openings 608 have a width of approximately 500 micrometers. In alternative embodiments, sight tube 600 includes any feature and/or opening that enables sight tube 600 to operate as described herein. For example, in some embodiments, sight tube 600 includes openings 608 on a support structure and not necessarily in a lattice.

In reference to FIGS. 2 and 4, a method of assembling imaging system 164 generally includes forming sight tube 166 and forming cooling channels 182 extending through sight tube 166 parallel to longitudinal axis 174. In the exemplary embodiment, sight tube 166 and cooling channels 182 are formed by an additive manufacturing process. For example, in some embodiments, layers of material such as powder are deposited on a surface and the material is selectively solidified (e.g., using an energy source and/or a binder) in an iterative process to form sight tube 166. In some embodiments, cooling channels 182 are formed during the additive manufacturing process by positioning and/or removing portions of the layers deposited on the surface. In some embodiments, sight tube 166 is formed using alloys including, for example and without limitation, nickel, chromium, iron, molybdenum, cobalt, and/or chrome. In alternative embodiments, sight tube 166 is formed using any material that enables sight tube 166 to function as described herein.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

For example, the additive manufacturing process facilitates imaging system 164 having a reduced size in comparison to at least some known imaging systems. In addition, the additive manufacturing process provides a broader range of design options and allows for integration of complex features into sight tube 166. For example, in some embodiments, different materials, such as foam materials, are integrated into the structure of sight tube 166 to provide enhanced cooling properties. Moreover, the additive manufacturing process reduces the cost to assemble imaging system 164. In particular, the additive manufacturing process allows precise formation of shapes such as curves and angles. In the exemplary embodiment, the additive manufacturing process allows sight tube 166 and cooling channels 204 to have different shapes because the process is not limited to shapes formed by machining processes such as drilling and boring. In contrast, at least some known imaging systems include only linear cooling channels because at least some known manufacturing processes do not provide for curves or angled portions.

As a result, imaging system 164 is able to withstand higher temperatures and pressures than other known imaging systems. For example, the shapes and configurations of sight tube 166, optical tube 168, cooling channels 182, and support structures 184 facilitate heat removal from components of imaging system 164 and allow imaging system 164 to maintain operating temperatures within the tolerances of components of imaging system 164.

Figure 17:
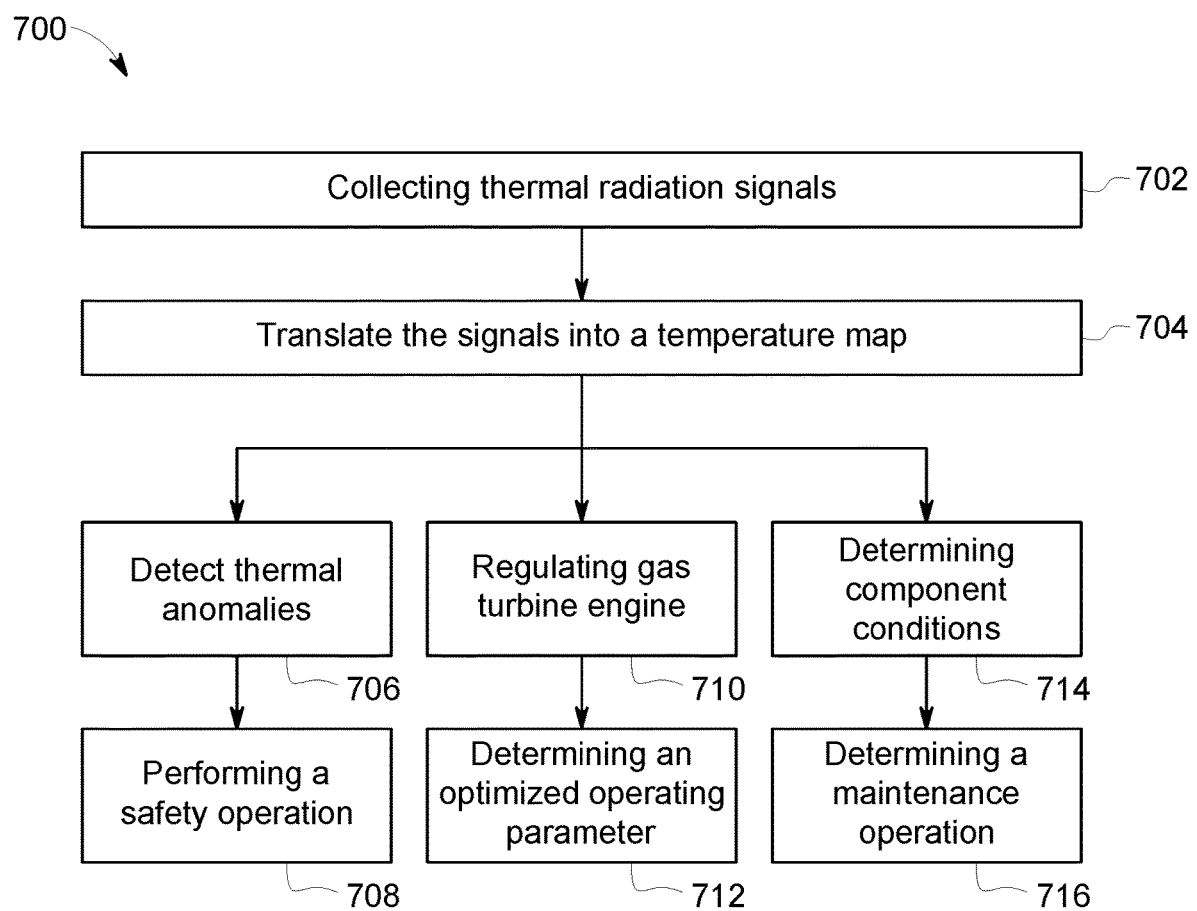
FIG. 17 is a flow chart of an exemplary method of processing thermal imaging data.

FIG. 17 is a flow chart of an exemplary method 700 of processing thermal imaging data. In some embodiments, method 700 is performed using processor 170 and/or controller 176 (shown in FIG. 2). Method 700 generally includes collecting 702 thermal radiation signals, translating 704 the signals into a temperature map, detecting 706 thermal anomalies, performing 708 a safety operation based on any detected thermal anomaly, regulating 710 an operating parameter of gas turbine engine 100 based on the temperature map, determining 712 an optimized operating parameter of gas turbine engine 100, determining 714 component conditions, and determining 716 a maintenance operation.

In the exemplary embodiment, collecting 702 includes collecting thermal radiation signals relating to any components of gas turbine engine 100. For example, in some embodiments, the thermal radiation signals relate to a blade, a nozzle, a combustor liner, a shroud, and/or any other component of gas turbine engine 100. The thermal radiation signals are collected 702 in a raw data form and are translated 704 into a processed format such as a temperature map. The thermal radiation signals are translated 704 by applying a calibration to convert the raw data form to the processed format for interpretation.

Also, in the exemplary embodiment, one or more functions are then performed based on the interpreted data. For example, method 700 includes functions such as detecting 706 thermal anomalies, regulating 710 an operating parameter of gas turbine engine 100, and determining 714 component conditions.

In addition, in the exemplary embodiment, thermal anomalies are detected 706 based on expected and/or average temperature readings. As used herein, a thermal anomaly refers to a temperature that deviates from a set of temperatures. If the thermal anomaly is beyond a threshold value and/or determined as an operating risk, a safety operation is performed 708 based on the detected thermal anomaly. In some embodiments, performing 708 a safety operation includes providing an indication or alarm to an operator. In further embodiments, the safety operation includes automatically regulating and/or powering off gas turbine engine 100 based at least in part on a detected temperature anomaly.

In addition, in some embodiments, determining 714 component conditions includes determining conditions of any components of gas turbine. For example, in some embodiments, conditions are determined for each component for the relevant radiation signals. In the exemplary embodiment, determining 714 includes generating models of the components and estimating service lives of the components. Based on the determined conditions, a maintenance operation is determined 716. In some embodiments, determining 714 includes schedule maintenance and/or repair of the components.

The above-described methods and systems facilitate inspection of components in turbomachines. For example, an imaging system includes a sight tube defining a cavity and an optical tube received in the cavity. The sight tube and the optical tube are modular to allow replacement of the sight tube and/or the optical tube. The sight tube is manufactured using an additive manufacturing process, which decreases cost to assemble the imaging system and enables the integration of complex features into the sight tube. For example, in some embodiments, a cooling channel having at least one of an angled portion and a curved portion is formed in the sight tube during the additive manufacturing process. In further embodiments, support structures are formed in the sight tube. In addition, in some embodiments, optical elements are positioned in the optical tube which is releasably coupled to the sight tube and supported by the support structures.

An exemplary technical effect of the methods, systems, and apparatus described herein includes at least one of (a) reducing the size of imaging systems for turbomachines; (b) providing modular components of imaging systems; (c) reducing the cost to assemble and operate imaging systems for turbomachines; (d) increasing the service life of components of imaging systems; (e) increasing heat removal from optical components of imaging systems for use in high temperature and high pressure environments; (0 enabling standardization of components of imaging systems; and (g) reducing time required for development and integration of components of imaging systems.

Exemplary embodiments of imaging systems for gas turbine engines and methods for operating are described above in detail. The imaging systems and methods of operating such systems are not limited to the specific embodiments described herein, but rather, components of systems and/or steps of the methods may be utilized independently and separately from other components and/or steps described herein. For example, the methods may also be used in combination with other high temperature combustion systems and methods, and are not limited to practice with only the gas turbine systems and imaging systems and methods as described herein. Rather, the exemplary embodiment can be implemented and utilized in connection with many other high temperature combustion applications.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An imaging system comprising:
    a sight tube extending along a longitudinal axis of said imaging system and configured to extend through an access port, said sight tube including a wall extending about the longitudinal axis and defining a cavity, wherein said wall is constructed of at least one metal; and
    a plurality of cooling channels defined by said wall and extending through said sight tube, wherein said plurality of cooling channels are configured to direct cooling fluid through said sight tube for cooling said imaging system, and wherein said plurality of cooling channels are formed in said sight tube such that at least one cooling channel of said plurality of cooling channels extends in a direction oblique to the longitudinal axis.

2. The imaging system in accordance with claim 1, wherein said plurality of cooling channels are connected in flow communication by at least one of an angled portion and a curved portion defined by said wall to form a closed-loop cooling system.

3. The imaging system in accordance with claim 1 further comprising at least one support structure extending from said wall into the cavity to support at least one optical element positioned in the cavity, wherein said at least one support structure includes a flexible material configured to reduce vibration of the at least one optical element.

4. The imaging system in accordance with claim 1 further comprising a plurality of support structures extending from said wall into the cavity to support at least one optical element positioned in the cavity, wherein said plurality of support structures define said at least one cooling channel.

5. The imaging system in accordance with claim 4 further comprising an optical tube, wherein each support structure of said plurality of support structures defines a porous surface configured to contact said optical tube.

6. The imaging system in accordance with claim 4 further comprising an optical tube, wherein each support structure of said plurality of support structures includes an edge configured to contact said optical tube, and wherein a majority of said optical tube is free from contact with said plurality of support structures.

7. The imaging system in accordance with claim 1, wherein said plurality of cooling channels comprises a first set of open-loop cooling channels and a second set of closed-loop cooling channels.

8. The imaging system in accordance with claim 1, wherein each cooling channel of said plurality of cooling channels contains an insulating material.

9. The imaging system in accordance with claim 1, wherein said plurality of cooling channels have a helical shape.

10. The imaging system in accordance with claim 1 further comprising at least one support structure within the cavity, wherein said at least one support structure includes a lattice.

11. The imaging system in accordance with claim 1 further comprising a flange configured to mount on a portion of a turbomachine, said flange coupled to said sight tube such that said sight tube extends through said flange and into the turbomachine when said flange is coupled to the turbomachine.

12. The imaging system in accordance with claim 11, wherein said flange includes a biasing member configured to contact said sight tube.

13. The imaging system in accordance with claim 11 further comprising a camera coupled to said flange and configured to generate images of the turbomachine.

14. The imaging system in accordance with claim 1, wherein said at least one cooling channel is formed in said sight tube using an additive manufacturing process such that said at least one cooling channel includes at least one of an angled portion and a curved portion along the extension through the sight tube.

15. The imaging system in accordance with claim 1 further comprising at least one support structure extending from said wall into the cavity to support at least one optical element positioned in the cavity, wherein said at least one support structure is aligned with at least one cooling channel of said plurality of cooling channels.

16. An imaging system for inspection of a turbomachine, said imaging system comprising:
- a sight tube extending along a longitudinal axis of said imaging system and configured to extend through an access port of the turbomachine, said sight tube including a wall extending about the longitudinal axis and defining a cavity therein;
- an optical tube including a wall configured to fit within the cavity of said sight tube, said optical tube positioned in the cavity such that said optical tube extends along the longitudinal axis, wherein said optical tube is modular and is releasably coupled to said sight tube, said optical tube including a plurality of optical elements positioned along the longitudinal axis, wherein said plurality of optical elements includes at least one lens positioned within said optical tube; and
- at least one cooling channel extending through said sight tube, wherein said at least one cooling channel is configured to extend alongside said at least one lens positioned within said optical tube when said optical tube is coupled to said sight tube.

17. The imaging system in accordance with claim 16 further comprising a plurality of support structures extending from said wall to support said optical tube, wherein said plurality of support structures define at least one cooling channel.

18. The imaging system in accordance with claim 17, wherein each support structure of said plurality of support structures defines a porous surface configured to contact said optical tube.

19. The imaging system in accordance with claim 17, wherein each support structure of said plurality of support structures includes an edge configured to contact said optical tube containing such that a majority of said optical tube is free from contact with said plurality of support structures.

20. The imaging system in accordance with claim 16, wherein said at least one cooling channel is formed in said sight tube using an additive manufacturing process such that said at least one cooling channel extends in a direction oblique to the longitudinal axis.

* * * * *